July 8, 1924.
H. W. SULLIVAN
TELEGRAPH CABLE
Filed March 31, 1921
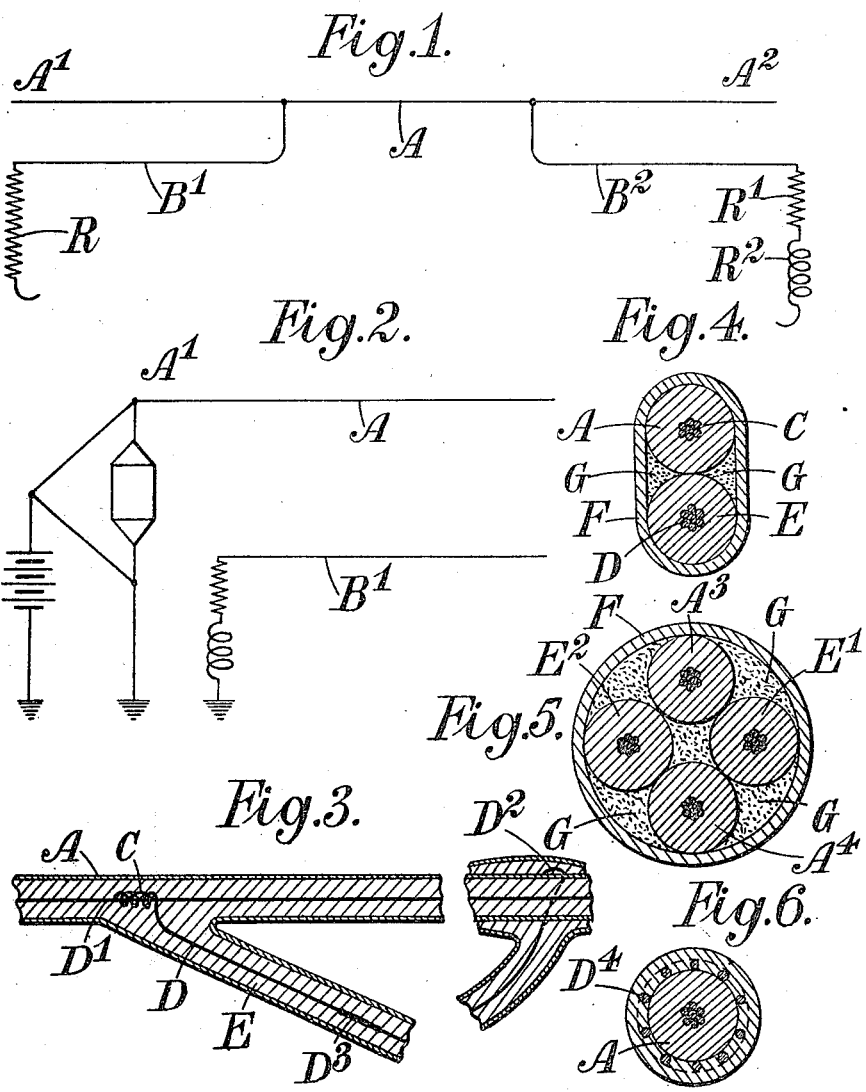

Patented July 8, 1924.

1,500,660

UNITED STATES PATENT OFFICE.

HERBERT WATSON SULLIVAN, OF LONDON, ENGLAND.

TELEGRAPH CABLE.

Application filed March 31, 1921. Serial No. 457,269.

*To all whom it may concern:*

Be it known that I, HERBERT WATSON SULLIVAN, a subject of the King of England, residing in London, England, have invented certain new and useful Improvements in Telegraph Cables, of which the following is a specification.

This invention relates to telegraph cables, in particular to submarine telegraph cables, its object being to improve the transmission of signals through them by the aid of one or more artificial leaks, that is to say leakage paths purposely introduced between the signalling conductor of the cable and earth or such other return circuit as may be employed. In connection with cables for telephonic work it has been proposed to incorporate in the cable inductance coils on the so-called Pupin system in order to improve the transmission, mainly over submarine lines. Owing to mechanical reasons, however, such coils cannot in practice be applied to deep sea telegraph cables. Heretofore it has been generally supposed that in submarine cables, especially those of long length such as Atlantic cables, it is of vital importance to keep the insulation of the cable permanently high and constant, in spite of the fact that the accumulation of charge within the core is well-known to exercise serious retardation and weakening of the signals. I, however, have concluded from theoretical and practical considerations that this point of view is fallacious when carried to an extreme and that the transmission value of a cable will be enhanced, and not impaired, by the employment at various positions along its length of leakage paths between the conductor and earth.

According to my present invention, therefore, I provide a submarine or other telegraph cable having one or more conductors each with one end connected electrically to the signalling conductor of the cable at a submerged or other point remote from the ends of the cable characterized by said conductor extending from the aforesaid point of connection to a signalling or other above-water "station". The term "station" is here employed to denote a point accessible for adjustment, repair or use of apparatus; it may for example be a shore station connected to a submarine cable, or it might be an island remote from the ends of the cable, not used as a signalling station.

Conveniently, according to this invention, a cable is provided with two artificial leaks in the manner above specified which said artificial leaks divide the cable into three lengths; preferably the three said lengths are roughly or approximately one-third of the length of the cable from end to end.

In one construction provided by this invention the signalling conductor between the said submerged or other point of connection and the shore end or other "station" is of less cross sectional area than the signalling conductor extending from the said point towards the other end of the cable.

This invention is now further described and its nature ascertained by reference to the accompanying drawings, in which—

Figure 1 is a diagram of the electrical circuits in one arrangement;

Figure 2 is a similar diagram of an alternative arrangement;

Figure 3 is a sectional drawing diagrammatic in character illustrating one construction of cable, and Figures 4, 5 and 6 are drawings of cross-sections illustrating three constructions of cable according to this invention.

With reference to Figure 1, the cable represented is a submarine cable marked A provided with two leakage conductors $B^1$, $B^2$ whose points of connection with the cable divide it roughly into three equal lengths and whose free ends are taken each to the nearer end of the cable. It is to be understood that the leaks $B^1$, $B^2$ are in the form of insulated conductors whose ends are left free for connection to earth either directly, or through an additional resistance as at R or through a resistance and impedance in series with one another as indicated at $R^1$ and $R^2$ respectively. Any other convenient or desirable means of connecting the ends of the leaks to earth may be employed. A particularly advantageous mode of connection is that indicated in Figure 2 where the cable and its leak are connected for use with an oscillatory curb. The curb itself is used in the ordinary and well-known manner and the leak $B^1$ is connected in relation thereto as shown in the drawing.

Where the leak is connected directly to earth, connection between the signalling conductor and the conductor constituting the artificial leak may be made as indicated diagrammatically in Figure 3. Here the signalling conductor is marked C and the leakage conductor D. The latter is brazed or soldered at $D^1$ to the conductor C, the joint is thoroughly insulated in any convenient manner, for example in the well-known manner with gutta percha, and the other end of the conductor D is brazed on to the sheathing of the cable A as at $D^2$. The cable at $D^2$ and the joint are thoroughly encased with gutta percha or other watertight insulator so as effectually to prevent contact of the joint with sea water. Alternatively a piece of conductor of the same material as the sheathing of the cable may be insulated and have its one end bared and joined to the sheathing at $D^2$ and its other end jointed to the conductor D and thoroughly insulated as at $D^3$. This reduces the risk of a joint between two dissimiliar metals being in contact with sea water or being otherwise exposed to corrosive influences. Further to eliminate trouble arising in such a manner, the joint at $D^2$ may be spot-welded electrically or otherwise so as not to introduce a second metal at this point. The object of these precautions is both to avoid the occurrence of an electromotive force at these points which might interfere with the working of the cable and also to prevent electrolytic corrosive action at such points.

The leakage conductor D with its insulation may be mechanically protected as distinct from the conductor A and may be laid spirally round it for so far as may be needed until the junction point $D^2$ is reached. Alternatively, however, the conductor D with its insulation (hereinafter referred to as the subsidiary core E) may be laid alongside the cable or signalling core A and both be enclosed, as indicated in Figure 4, within a single mechanical protective covering, or set of coverings, F. For this purpose fillings G of jute or other suitable material may be inserted to facilitate the covering process and enable the cable to be subsequently handled with less risk of damage or deformation.

In an alternative construction indicated in Figure 5 the signalling cable is made of two cores $A^3$, $A^4$ arranged in parallel with one another and the subsidiary cable is also made of two cores $E^1$, $E^2$ in parallel with one another. This enables the four cores to be laid up side by side as shown in Figure 5 and present a contour more closely approximating to a circle than does the arrangement of Figure 4 thus facilitating the manufacture or otherwise providing an article lending itself well to manufacture and subsequent handling. The mechanical protective coverings are indicated at F and fillings G may also be employed as illustrated.

Where it is desired to approach a cylindrical formation as closely as possible the conductor of the subsidiary core may be laid as strands $D^4$ around the signalling core A. In such a case in order to enable the conductors to be kept in their proper spatial relation to one another the inner core at least should be insulated with india rubber in order that it may not become displaced during the subsequent process of insulating the outer conductors. Obviously both may be insulated with india rubber and obviously again the outer conductors may be the signalling conductors and the inner the leakage conductor, if preferred.

An advantage accruing to the arrangements provided by this invention is that the signalling core may be made smaller between the point of connection to the subsidiary core and the end of the cable than would be necessary to obtain the same excellence of signalling without the use of the subsidiary core. Thus at such a point as that in Figure 1 where the conductors $B^1$, $B^2$ are attached to the cable A the two end lengths of the cable may be made of smaller section than the central length which lies between $B^1$ and $B^2$. Under favourable conditions, the joint weight of copper and insulation in the signalling core plus the subsidiary core may be made less than in the signalling core alone without the subsidiary core, without sacrifice of speed in signalling. The value of this advantage will be obvious to cable engineers who recognize that the maximum practicable size of signalling core has now been reached so far as present commercial and mechanical considerations permit.

As an example of values that may be employed, marked improvement in the shape of the signals, although of course accompanied by a reduction in their size, has been obtained on an artificial line by inserting a resistance leak of 1,000 ohms in the middle of the line. The artificial line had a KR value of three millions, a ratio value of 26 ohms per microfarad, there being a total capacity of 525 microfarads and a total resistance of 5,720 ohms; the insulation resistance was approximately 1 megohm. Although the magnitude of the signals was reduced their shape was markedly improved.

Electrical advantages further resulting from the employment of the said subsidiary core are the ease with which the present difficulties in maintaining balance for duplex operation may be disposed of. Moreover, in the localization of faults, the subsidiary core, as will be obvious to a cable engineer, may be of great assistance and particularly when two cores are employed so connected as to divide the cable into three electrical portions. As above pointed out these may be exactly one-third of the cable length or may be quite roughly of such value.

If one leak only is employed this is conveniently situated at the centre of the cable, but it may be arranged as in Figure 1, but it may, as may the two of Figure 2, be arranged in fact at any point selected for convenience of operation or two leakage paths in parallel with one another may be arranged to extend in opposite directions from the centre.

It will be understood that the subsidiary core need not be brought back to a shore station in the usual sense of the latter term, but may be brought to an island situated between two signalling stations provided that the island provides sufficient accessibility for the purposes of examination and repair of that end of the subsidiary core. At such a point a plain resistance leak or an inductive leak is inserted between the conductor of the subsidiary core and earth in any convenient way and may subsequently be inspected and adjusted as occasion may demand. In extreme cases or where the waterway is not exposed to traffic and where other conditions permit such a "station" may take the form of a buoy or equivalent device within which the necessary apparatus is carried and within which the connection between the apparatus and the conductor of the subsidiary core is effected.

An instance of the possible application of this invention is to be found in the case of a cable newly laid between two stations and passing, but not touching an intermediate cable-station. According to my invention this cable might be tapped near the said intermediate station with a leakage path cable, as described, and the cable constituting this path be brought into the intermediate station; at this point resistances or inductances or both, as found most suitable, would be then inserted between the leakage cable and earth. In cases where two cables running in opposite directions from an intermediate station to two other stations are plugged through at the intermediate station so as to constitute a direct cable between the said two other stations, the rate of transmission between these through the direct cable may be accelerated by inserting, as provided by this invention, a leak to earth from the said plugged point of junction at the intermediate station.

Where this invention is applied to cables other than submarine cables, the term "above-water station" is to be understood to mean any point providing sufficient accessibility to enable examination and repair of the apparatus connected to that end of the subsidiary core, to be carried out.

What I claim as my invention and desire to secure by Letters Patent is:—

1. In a telegraph system, the combination of a signal transmitting conductor, earthing apparatus located at an "above-water-station" and at least one other conductor extending lengthwise along and side by side with the said signal transmitting conductor, and electrically connected at one end to said apparatus and at the other end to the said signal transmitting conductor at a point between and remote from the ends thereof, said conductors being enclosed within a protective covering, substantially as set forth.

2. In a telegraph system, the combination of a signal transmitting conductor, two sets of earthing apparatus each located at an "above-water-station," and two other conductors each electrically connected at one end to one of the said two sets of earthing apparatus and at the other end to the signal transmitting conductor, the said point of connection of one being distant from one end of the said signal transmitting conductor by a distance equal to between two-tenths and four-tenths of the length thereof and that of the other being distant from the other end of the said signal transmitting conductor by a distance equal to between two-tenths and four-tenths of the length thereof, substantially as set forth.

3. In a telegraph system, the combination of a signal transmitting conductor that has a less cross sectional area between one of its ends and a point situated from that end at a distance of between two-tenths and four-tenths of the entire length of said conductor than the cross sectional area at the center of its length, earthing apparatus located at an "above-water-station" and another conductor electrically connected at one end to said apparatus and at the other end to the signal transmitting conductor at a point in that said portion thereof which is of lesser cross sectional area, substantially as set forth.

4. In a telegraph system, the combination of two signal transmitting conductors connected in parallel with one another, earthing apparatus located at an "above-water-station" and two other conductors connected in parallel with one another and each electrically connected at one end to said apparatus and at the other end to one of said two signal transmitting conductors at a point between and remote from the ends thereof, which said two other conductors are laid up side by side with the said signal transmitting conductors as a composite four-core cable from one end thereof to the said remote point, substantially as set forth.

In testimony whereof I affix my signature.

HERBERT WATSON SULLIVAN,